United States Patent
Ibrahim et al.

(10) Patent No.: US 12,485,405 B1
(45) Date of Patent: Dec. 2, 2025

(54) METHOD OF PRODUCING HYDROGEN GAS USING NANOCOMPOSITE CATALYST

(71) Applicant: IMAM MOHAMMAD IBN SAUD ISLAMIC UNIVERSITY, Riyadh (SA)

(72) Inventors: Mohamed Nady Abd El-Hameed Ibrahim, Riyadh (SA); Mohamed Khairy Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/210,455

(22) Filed: May 16, 2025

(51) Int. Cl.
*B01J 27/24* (2006.01)
*B01J 23/02* (2006.01)
(Continued)

(52) U.S. Cl.
CPC ............ *B01J 27/24* (2013.01); *B01J 23/02* (2013.01); *B01J 23/18* (2013.01); *B01J 35/45* (2024.01); *B01J 35/58* (2024.01); *B01J 35/613* (2024.01); *B01J 35/615* (2024.01); *B01J 35/633* (2024.01); *B01J 35/635* (2024.01); *B01J 35/647* (2024.01); *B01J 35/695* (2024.01); *B01J 37/04* (2013.01); *B01J 37/06* (2013.01); *B01J 37/08* (2013.01); *B01J 37/343* (2013.01); *C01B 3/065* (2013.01)

(58) Field of Classification Search
CPC ............ C01B 3/065; B01J 23/18; B01J 23/02
See application file for complete search history.

(56) References Cited

U.S. PATENT DOCUMENTS

2022/0243343 A1   8/2022   Lee et al.

FOREIGN PATENT DOCUMENTS

| CN | 104607230 | * | 5/2015 | ............ Y02W 10/37 |
| CN | 111195526 A | | 5/2020 | |
| CN | 114177928 A | | 3/2022 | |

OTHER PUBLICATIONS

Maha Alhaddad, et al., "Bi2O3/g-C3N4 nanocomposites as proficient photocatalysts for hydrogen generation from aqueous glycerol solutions beneath visible light", Ceramics International, vol. 46, Issue 16, Part A, Nov. 2020, pp. 24873-24881, Excerpts only, 9 pages.

(Continued)

*Primary Examiner* — Anthony J Zimmer
*Assistant Examiner* — Eric Scott Sherman
(74) *Attorney, Agent, or Firm* — Oblon, McClelland, Maier & Neustadt, L.L.P.

(57) ABSTRACT

A method of producing hydrogen comprising hydrolyzing sodium borohydride ($NaBH_4$) with water at a temperature of from about 20 to about 75° C. in the presence of a particulate crystalline nanocomposite catalyst, wherein the ratio by weight of sodium borohydride to the particulate crystalline nanocomposite catalyst is from about 1:1 to about 5:1. The particulate crystalline nanocomposite catalyst comprises: a monoclinic $Bi_2O_3$ crystalline phase; a $CaSiO_3$ crystalline phase; and, a graphitic-$C_3N_4$ crystalline phase, wherein at least a fraction of the graphitic-$C_3N_4$ is in the form of mesoporous nanosheets.

20 Claims, 6 Drawing Sheets

(51) Int. Cl.
*B01J 23/18* (2006.01)
*B01J 35/45* (2024.01)
*B01J 35/58* (2024.01)
*B01J 35/61* (2024.01)
*B01J 35/63* (2024.01)
*B01J 35/64* (2024.01)
*B01J 35/66* (2024.01)
*B01J 37/04* (2006.01)
*B01J 37/06* (2006.01)
*B01J 37/08* (2006.01)
*B01J 37/34* (2006.01)
*C01B 3/06* (2006.01)

(56) References Cited

OTHER PUBLICATIONS

Luis Ernesto Arteaga-Pérez, et al., "Technological evaluation of a Co—SiO2 and Cu—CaSiO3 as catalysts for the hydrogen production using ethanol. Reaction mechanism and kinetics of the ionic adsorption", Afinidad—Barcelona, vol. 66, No. 543, Sep. 2009, pp. 398-402, Abstract only, 2 pages.

* cited by examiner

METHOD OF PRODUCING HYDROGEN GAS USING NANOCOMPOSITE CATALYST

BACKGROUND

Technical Field

The present disclosure is directed towards a method of producing hydrogen gas, and more particularly, towards a bismuth trioxide ($Bi_2O_3$) and calcium silicate ($CaSiO_3$) based nanocomposite dispersed on a matrix of graphitic carbon nitride (g-$C_3N_4$) nanosheets for producing hydrogen gas using sodium borohydride ($NaBH_4$).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The tremendous industrialization and population increase in recent years have led to a search for alternate energy sources to meet the expanding energy demand. Primarily, the depletion of non-renewable energy resources and environmental concerns are compelling societies to switch to clean, renewable energy sources. On account of its high energy density (120 megajoules per kilograms (MJ/kg)), non-toxicity, and ecological friendliness, hydrogen gas has emerged as an important energy carriers among renewable sources.

While solar energy generation is inexpensive, the storage of this energy incurs costs due to a reliance on batteries, which require frequent replacement and pose challenges in their safe disposal. Conversely, hydrogen energy provides numerous advantages over batteries in terms of energy conservation and powering diverse applications. A key benefit is that that hydrogen possesses a higher energy density than conventional batteries, allowing it to store greater energy in a less volume: this renders hydrogen optimal for applications such as transportation, where weight and space are paramount. Refueling a hydrogen vehicle requires only a few minutes, akin to conventional gasoline automobiles, whereas charging batteries can be far more time-consuming. Hydrogen fuel cells, for instance, offer extended ranges relative to battery electric vehicles, rendering fuel-cell powdered vehicles appropriate for heavy-duty applications and long-distance journeys. In larger-scale vehicular applications, such as trucks or ships, hydrogen fuel cells may be lighter than comparable battery systems, which is essential for efficiency and payload capacity. Moreover, in contrast to batteries, which deteriorate over time and necessitate replacement, hydrogen systems can sustain performance for an extended duration with adequate maintenance. Hydrogen production can be amplified from renewable sources, potentially resulting in sustainable and extensive energy storage options: the generation of hydrogen through electrolysis utilizing solar or wind energy is an important example. Hydrogen derived from renewable sources furthermore provides a clean energy alternative, generating solely water vapor when utilized in fuel cells.

Hydrogen is applicable in other areas outside transportation, including industrial operations, heating, and energy storage, hence offering variety in energy solutions. Hydrogen can retain surplus renewable energy for extended durations, assisting in the equilibrium of supply and demand within the energy system. Hydrogen can stabilize the electrical grid by serving as a versatile energy storage solution, absorbing surplus energy during peak production periods.

Despite its inherent advantages, the difficulties in safely storing and transporting hydrogen have stymied its widespread utilization.

Hydrogen is typically stored either: under compression; as a liquid under deep refrigeration; through being chemically bound within a metal hydride; or, through being chemically bound within other compounds. Sodium borohydride ($NaBH_4$) has become an important compound for hydrogen storage given its stability, non-flammability and non-toxicity: $NaBH_4$ further contains two moles of hydrogen ($H_2$) and that hydrogen constitutes 10.8 wt. % of the compound.

When required, hydrogen is released from $NaBH_4$ by hydrolysis:

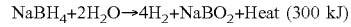
$$NaBH_4 + 2H_2O \rightarrow 4H_2 + NaBO_2 + \text{Heat (300 kJ)}$$

According to this reaction, the hydrolysis releases the 2 moles of hydrogen bound within the $NaBH_4$, as well as hydrogen bound within the reactant water.

$NaBH_4$ may undergo self-hydrolysis but this occurs at a very slow reaction rate. Consequently, either heterogeneous or homogeneous catalysts are employed to drive the hydrolysis reaction at viable temperatures, such as temperatures close to room temperature. Heterogeneous catalysts are preferred in this context on the basis that they: typically possess longer functional lifetimes; can be facilely separated from the sodium metaborate ($NaBO_2$) solution formed as a co-product of the hydrolysis reaction; and, are not associated with the formation of gaseous side products, such as diborane.

Active heterogeneous catalysts for the hydrolysis process of sodium borohydride have predominantly been based on noble metals, such as Pt, Ru and Pd. [See: Huff C, Long J M, Heyman A, Abdel-Fattah T M (2018) *ACS Appl Energy Mater* 1:4635-4640; Brack P, Dann S E, Wijayantha K G U (2015) *Energy Sci Eng* 3:174-188; Wei L, Ma M, Wang D, Wang Q, Lu Y, Zhang S (2018) *Funct. Mater. Lett.* 11:1850079.] However such noble metals are associated with high costs, low abundance and toxicity [See Bullock R M (2017) *Chemistry* 2:444-446].

Accordingly, one objective of the present disclosure is to provide a composite material for hydrogen production via hydrolysis of sodium borohydride ($NaBH_4$). This method circumvents the aforementioned drawbacks and helps to achieve enhanced activity and efficiency in hydrogen generation.

SUMMARY

In an exemplary embodiment, a method of producing hydrogen gas is described. The method comprises hydrolyzing sodium borohydride ($NaBH_4$) with water at a temperature of from about 20 to about 75° C. in the presence of a particulate crystalline nanocomposite catalyst, wherein the ratio by weight of sodium borohydride to the particulate crystalline nanocomposite catalyst is from about 1:1 to about 5:1. The particulate crystalline nanocomposite catalyst comprises, as determined by X-Ray Diffraction: a monoclinic $Bi_2O_3$ crystalline phase; a $CaSiO_3$ crystalline phase; and, a graphitic-$C_3N_4$ crystalline phase, wherein at least a fraction of the graphitic-$C_3N_4$ is in the form of mesoporous nanosheets.

In some embodiments, the ratio by weight of $Bi_2O_3$ to $CaSiO_3$ to graphitic-$C_3N_4$ in the particulate crystalline nanocomposite is about (0.8-1.2):(0.8-1.2):(0.8-1.2).

In some embodiments, at least a fraction of the $Bi_2O_3$ and at least a fraction of the $CaSiO_3$ of the crystalline nanocomposite are in the form of nanowires.

In some embodiments, at least 50 wt. % of the $Bi_2O_3$ is in the form of nanowires and at least 50 wt. % of the $CaSiO_3$ is in the form of nanowires.

In some embodiments, the nanowires of $Bi_2O_3$ and $CaSiO_3$ have a median length of from about 20 to about 100 nanometers (nm), as determined by Transmission Electron Microscopy (TEM).

In some embodiments, at least 50 wt. % of the graphitic-$C_3N_4$ is in the form of mesoporous nanosheets.

In some embodiments, the crystalline nanocomposite has a multimodal pore size distribution, as determined by Barrett-Joyner-Halenda (BJH) desorption analysis.

In some embodiments, the crystalline nanocomposite has a trimodal pore size distribution, as determined by BJH desorption analysis.

In some embodiments, the trimodal pore size distribution of the crystalline nanocomposite has: a first mode in the range of from about 2 to about 6 nm; a second mode in the range of from about 8 to about 12 nm; and, a third mode in the range of from about 14 to about 18 nm.

In some embodiments, the crystalline nanocomposite has a surface area of from about 60 to about 100 meter square per gram ($m^2$/g), as determined by Brunauer-Emmett-Teller (BET) analysis.

In some embodiments, the crystalline nanocomposite has a surface area of from about 70 to about 90 $m^2$/g, as determined by BET analysis.

In some embodiments, the crystalline nanocomposite has a pore volume of from about 0.1 to about 0.5 cubic centimeter per gram ($cm^3$/g), as determined by Barrett-Joyner-Halenda (BJH) desorption analysis.

In some embodiments, the crystalline nanocomposite has a pore volume of from about 0.2 to about 0.3 $cm^3$/g, as determined by BJH desorption analysis.

In another exemplary embodiment, a method of preparing the particulate crystalline nanocomposite is described. The method comprises: forming a solution of a calcium salt and an alkali metal silicate in a solvent including water and a $C_1$-$C_4$ alkanol; heating the solution at a temperature of from about 150 to about 250° C. to form a dry product of $CaSiO_3$; forming graphitic-$C_3N_4$ by heating urea in a closed vessel at a temperature of from about 500 to about 700° C.; forming an acidified solution in a polar protic solvent of a bismuth salt and reducing sugar; heating the acidified solution at a temperature of from about 150 to about 250° C. for a sufficient duration to carbonize the reducing sugar to form a carbonized product; comminuting the carbonized product of the heating stage; calcining the comminuted carbonized product at a temperature of from about 500 to about 1200° C. for a duration of from about 1 to about 5 hours to form $Bi_2O_3$; dispersing the $CaSiO_3$, graphitic-$C_3N_4$ and $Bi_2O_3$ in a polar protic solvent and heating the dispersion at a temperature of from about 150 to about 250° C. at a pressure of from about 2 to about 8 Bar; and, separating the solid crystalline nanocomposite from the heated dispersion.

In some embodiments, the ratio by weight of sodium borohydride to the particulate crystalline nanocomposite catalyst is from about 1:1 to about 3:1.

In some embodiments, sodium borohydride is hydrolyzed with water at a temperature of from about 25 to about 70° C.

In some embodiments, sodium borohydride is hydrolyzed with water at a temperature of from about 35 to about 60° C.

In some embodiments, the method has a hydrogen generation rate (HGR) of from about 100 to about 1500 milliliters per minute per gram (mL $min^{-1}$ $g^{-1}$) based on the weight of the sodium borohydride ($NaBH_4$).

In some embodiments, the method has a hydrogen generation rate (HGR) of from about 200 to about 1500 mL $min^{-1}$ $g^{-1}$ based on the weight of the sodium borohydride ($NaBH_4$).

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
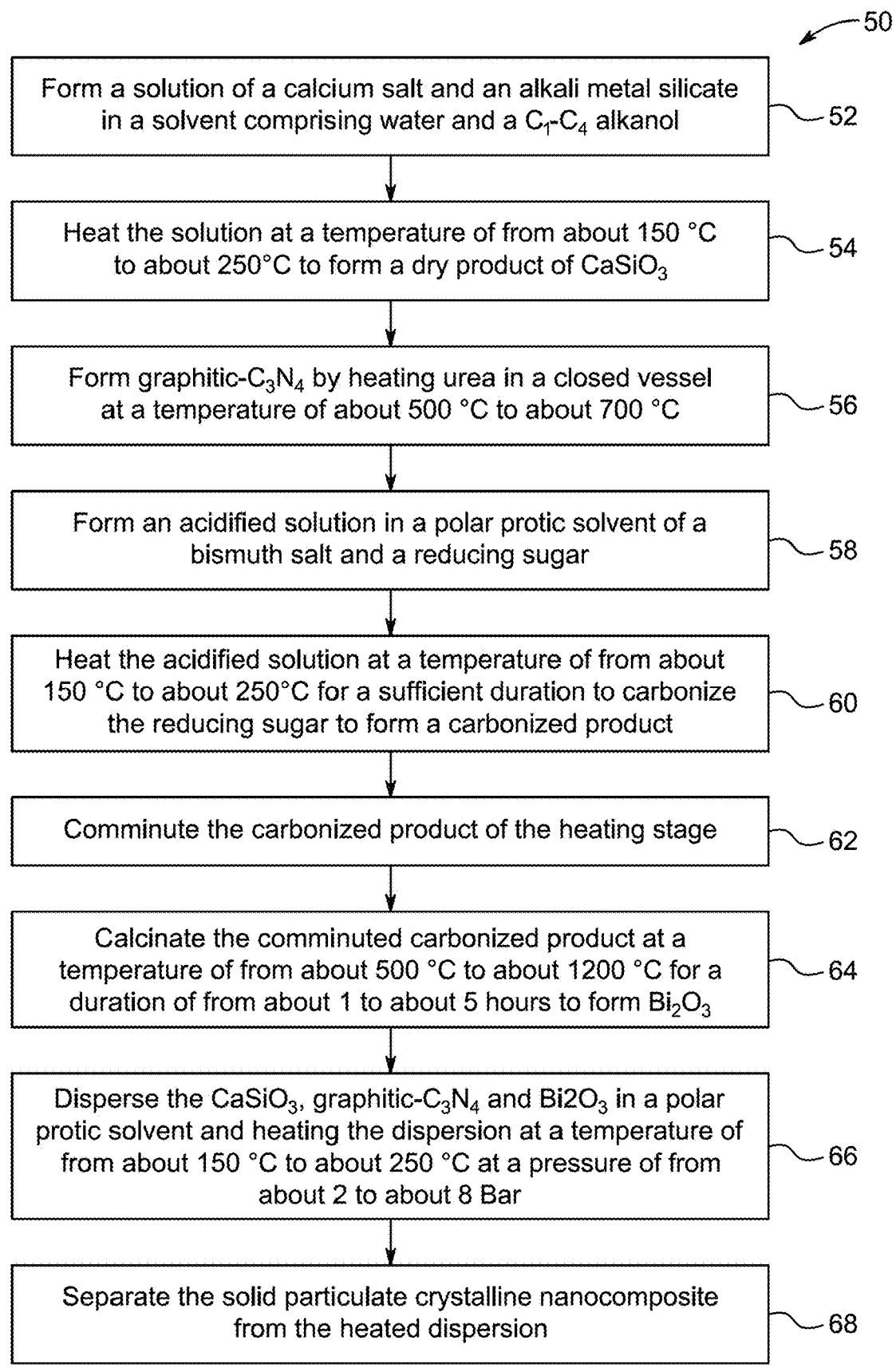
FIG. 1 is a schematic flow chart of a method of preparing a particulate crystalline nanocomposite ($Bi_2O_3$/$CaSiO_3$/g-$C_3N_4$ catalyst), according to certain embodiments.

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term "room temperature" refers to a temperature range of 23 degrees Celsius (° C.)+2° C. in the present disclosure. As used herein, "ambient conditions" means the temperature and pressure of the surroundings in which the substance, composition or article is located.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., or 1° C.

As used herein, the term "fraction" refers to a numerical quantity which defines a part up to, but not including, 100 percent or the entirety of the thing in question.

As used herein the term "disposed" refers to being positioned, placed, deposited, arranged or distributed in a particular manner.

As used herein, the term number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term "Scanning Electron Microscopy" or "SEM" refers to a surface-imaging technique that produces images of a sample by scanning the sample with a focused beam of electrons. Unless otherwise specified, the SEM shall include all imaging techniques using electron beams for imaging.

As used herein, the term "high-resolution transmission electron microscopy (HRTEM)" refers to a powerful imaging technique used to observe the fine details of materials at the atomic scale. In HRTEM, a high-energy electron beam is transmitted through a thin sample, and the transmitted electrons are used to form detailed images with extremely high resolution.

As used herein, the term "X-ray diffraction" or "XRD" or "X-ray crystallography" refers to basic technique for obtaining information on the atomic structure of crystalline materials used as a standard laboratory technique. Unless otherwise specified, the XRD shall include an analytical technique based on the diffraction of X-rays by matter, especially for crystalline materials.

As used herein with respect to X-ray diffraction analysis, "JCPDS" denotes the Joint Committee on Powder Diffraction Standards.

The term "unit cell" as used herein refers to the smallest and simplest volume element (i.e., parallelpiped-shaped block) of a crystal that is completely representative of the unit or pattern of the crystal, such that the entire crystal can be generated by translation of the unit cell. The dimensions of the unit cell are defined by six numbers: dimensions a, b and c; and, angles $\alpha$, $\beta$ and $\gamma$ (Blundel et al., 1976, *Protein Crystallography*, Academic Press, the disclosure of which is incorporated herein by reference in its entirety). A crystal is an efficiently packed array of many unit cells.

The term "triclinic crystalline phase" refers to a crystal structure in which the unit cell is characterized by three mutually perpendicular aces of unequal length ($a \neq b \neq c$) wherein further $\alpha \neq \beta \neq \gamma$.

An orthorhombic crystalline phase refers to a crystal structure having three mutually perpendicular axes of unequal lengths ($a \neq b \neq c$) but wherein the crystal lattice forms a rectangular prism where the edges represent the three axes, all intersecting at 90-degree angles ($\alpha = \beta = \gamma = 90°$).

A cubic crystalline phase refers to a crystal structure where the unit cell is shaped like a cube, with three equal-length axes that are perpendicular to each other (at 90° angles). In this crystal system, the atoms or ions are arranged in a repeating pattern within the cubic lattice. The cubic crystalline structure is highly symmetric, possessing four threefold rotational axes and three fourfold rotational axes, permitting rotations of 90° around its specific axes and rotations of 120° about the body diagonals of the cube, while maintaining the same structure.

A monoclinic crystalline phase refers to a crystal structure in which the unit cell of the material is characterized by three unequal axes, with two of them forming an angle that is not 90°, while the third axis is perpendicular to the plane formed by the other two axes. In other words, the monoclinic crystal system has one axis that is tilted, resulting in a lack of orthogonality between all three axes. The unit cell in the monoclinic phase is thus asymmetrical, with distinct axial lengths and one non-90° angle.

A tetragonal crystalline phase refers to a crystal structure in which the unit cell of the lattice has two axes of equal-length and a third axis that is of different length, but wherein all axes are at right angles (90°) to each other. This crystal system may be represented as a square base (with two equal axes) and a height (the third axis) which is different, resulting in a rectangular prism-like shape. The tetragonal crystal structure possesses a four-fold rotational symmetry around its unique axis.

As used herein, the term "average crystallite size" refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometers (nm) and reflects the typical dimensions of the crystalline regions in the material, excluding any amorphous regions or defects.

As used herein, the term "particle" refers to a small object that acts as a whole unit with regard to its transport and properties. As used herein, "nanoparticles"—sometimes contracted herein to NPs—refers to particles having a particle size of 1 nanometer (nm) to 1000 nm.

Unless otherwise stated, the term "particle size" refers to the largest axis of the particle. In the case of a generally spherical particle, the largest axis is the diameter.

The term "median volume particle size" (Dv50), as used herein, refers to a particle size corresponding to 50% of the volume of the sampled particles being greater than and 50% of the volume of the sampled particles being smaller than the recited Dv50 value. Similarly, if used, the term "Dv90" refers to a particle size corresponding to 90% of the volume of the sampled particles being smaller than and 10% of the volume of the sampled particles being greater than the recited Dv90 value. Particle size is determined herein by Scanning Electron Microscopy (SEM).

As used herein, the term "nanocomposite" refers to a composite material in which at least one dimension of a component thereof is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

As used herein, the term "porosity" refers to a measure of the void or vacant spaces within a material. As used herein, the term "pore volume" refers to the total volume of void spaces (pores) within a material that is capable of being filled by a gas or liquid: it is typically expressed in cubic centimeters per gram ($cm^3/g$). As used herein, the term "pore diameter" refers to the median width or size of the pores (void spaces) within a material, typically measured in nm or angstroms (Å).

Pores may be micropores, mesopores, macropores, and/or a combination thereof. The pores exist in the bulk material, not necessarily in the molecular structure of the material. The term 'microporous' means that particulate crystalline nanocomposite have pores with an average pore width (i.e., diameter) of less than 2 nm. The term 'mesoporous' means the pores of the nanocomposite have an average pore width of 2-50 nm. The term 'macroporous' means the pores of the nanocomposite have an average pore width larger than 50 nm. Pore size may be determined by methods including, but not limited to, gas adsorption (e.g., $N_2$ adsorption), mercury intrusion porosimetry, and imaging techniques such as SEM and X-ray computed tomography (XRCT).

Having regard to a parameter distribution of the disclosed material, the term "monomodal" references only one peak being observed in a frequency distribution graph of said parameter. The term "polymodal" references a distribution with two or more distinct peaks or modes. The terms bimodal and trimodal may be utilized herein to reference the presence of two or three modes, respectively.

As used herein, the Brunauer-Emmett-Teller (BET) analysis references the method of measuring the specific surface area ($m^2/g$) of a solid material via the adsorption of gas molecules onto the surface of the solid, as detailed in standard NF ISO 5794-1, Appendix E (June 2010).

As used herein, the Barrett, Joyner, and Halenda (BJH) desorption analysis refers to the method of determining the volume of mesopores per unit mass (mL/g) of a solid material utilizing the adsorption and desorption isotherms associated with gas molecules inside the mesopores of the solid, as detailed in Technical Standard DIN 66134:1998-02.

As used herein, the term "porous particulate nanocomposite" refers to a material composed of discrete particles that form a structure with interconnected pores or voids. These pores allow for the passage of fluids or gases, contributing to the material's overall porosity. The composite typically consists of two or more distinct phases, which may include various inorganic or organic components, and is characterized by its unique morphology, such as irregularly shaped particles or aggregates.

The term "graphitic carbon nitride" often abbreviated to g-$C_3N_4$, refers to a family of carbon nitride compounds with a layered structure similar to graphene. Graphitic carbon nitride may be considered a synthetic polymer primarily composed of carbon and nitrogen, with some hydrogen impurities.

The term "powder", as used herein, means a composition that consists of finely dispersed solid particles that are free-flowing.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

The term "polar solvent" as used herein refers to a solvent having a dielectric constant ($\varepsilon$) of more than 5 as measured at 25° C. The determination of dielectric constant ($\varepsilon$) is known in the art: the use of measured voltages across parallel plate capacitors in such determinations may be mentioned. The term "polar solvent" may encompass both aprotic and protic solvents, wherein protic solvents are those solvents which are capable of yielding or accepting a proton and aprotic solvents are those solvents that do not yield or accept a proton.

Water, for use as a (co-)solvent or diluent herein, is intended to mean water of low solids content as would be understood by a person of ordinary skill in the art. The water may, for instance, be distilled water, demineralized water, deionized water, reverse osmosis water, boiler condensate water, or ultra-filtration water. Tap water may be tolerated in certain circumstances.

As used herein, 'comminuting' refers to process of reducing the average size of solid materials into smaller particles, by crushing, grinding, cutting, vibrating, or other processes.

The term "hydrolysis", as used herein, is the chemical reaction of a molecule with water to produce two or more smaller molecules.

As used herein, 'hydrogen generation rate' (HGR) refers to the amount of hydrogen gas produced per unit of time during a chemical reaction.

The term "sonication" refers to a process that uses sound energy (sonic waves) to agitate particles in a sample. As used herein, the term "ultrasonication" refers to irradiation with ultrasonic waves having a frequency of at least 20 kHz. Without intention to limit the present disclosure, (ultra) sonication may be performed using an (ultra)sonic bath or an (ultra)sonic probe.

As used herein, the term "calcination" refers to a thermal treatment process which is conducted in the absence of, or under a restricted supply of ambient oxygen. This is performed to remove impurities or volatile substances and/or to induce thermal decomposition or a change in the thermally treated material.

The term "actinic radiation" includes light with wavelengths of electromagnetic radiation ranging from the ultraviolet ("UV") light range, through visible light range, and into the infrared range. Actinic radiation generally has a wavelength of from 150 to 2000 nm.

As used herein, "$C_1$-$C_n$ alkyl" group refers to a monovalent group that contains from 1 to n carbons atoms, that is a radical of an alkane and includes straight-chain and branched organic groups. As such, a "$C_1$-$C_4$ alkyl" group refers to a monovalent group that contains from 1 to 4 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present disclosure, such alkyl groups may be unsubstituted or may be substituted with one or more halogen. Where applicable for a given moiety (R), a tolerance for one or more non-halogen substituents within an alkyl group will be noted in the specification.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labelled compounds of the disclosure may generally be prepared by conventional techniques known to those skilled in the art or by processes analogous to those described herein, using an appropriate isotopically-labelled reagent in place of the non-labelled reagent otherwise employed.

The present disclosure is intended to include all hydration states of a given compound or formula, unless otherwise noted or when heating a material.

Aspects of the present disclosure are directed towards a particulate crystalline nanocomposite, including $Bi_2O_3$/CaSiO$_3$/g-C$_3$N$_4$, designed to function as a catalyst to enhance the hydrolysis of sodium borohydride (NaBH$_4$) with water for efficient production of hydrogen gas. The catalyst facilitates the safe and rapid release of hydrogen from NaBH$_4$, making it an efficient solution for clean hydrogen production. The present disclosure circumvents the drawbacks of prior art by addressing key limitations, such as high catalyst costs, slow reaction rates, and environmental concerns. Traditional catalysts often require expensive materials, resulting in inefficient or slow hydrogen production. In contrast, the present disclosure uses a cost-effective catalyst that promotes faster hydrogen generation without relying on toxic or scarce materials. The simplicity of its preparation and its high catalytic activity also ensures scalability and practical applicability, making it a more efficient and sustainable alternative to existing catalytic materials. A method of producing hydrogen gas is described. The method includes hydrolyzing sodium borohydride (NaBH$_4$) with water at a temperature of from about 20 to about 75° C. in the presence of a particulate crystalline nanocomposite catalyst. Herein, hydrolyzing sodium borohydride refers to the chemical reaction in which NaBH$_4$ reacts with water, typically releasing hydrogen gas. In the process, NaBH$_4$ is broken down by water, generating hydrogen as a by-product. The hydrolysis of NaBH$_4$ is generally catalyzed to lower the activation energy of the reaction, to improve efficiency and to control the reaction rate.

The particulate crystalline nanocomposite comprises, as determinable by X-Ray diffraction: a monoclinic $Bi_2O_3$ crystalline phase; a CaSiO$_3$ crystalline phase; and, a graphitic-C$_3$N$_4$ crystalline phase. The presence of the monoclinic crystalline phase of $Bi_2O_3$ does not, however, preclude the presence of further crystalline phases of this trioxide compound, typically as the minority phases.

In some embodiments, the ratio by weight of $Bi_2O_3$ to CaSiO$_3$ to graphitic-C$_3$N$_4$ in the crystalline nanocomposite is about (0.8-1.2):(0.8-1.2):(0.8-1.2). For example, the ratio by weight of $Bi_2O_3$ to CaSiO$_3$ to graphitic-C$_3$N$_4$ in the crystalline nanocomposite may be about (0.9-1.1):(0.9-1.1):(0.9-1.1). These ranges each encompass a ratio by weight of $Bi_2O_3$ to CaSiO$_3$ to graphitic-C$_3$N$_4$ of in the crystalline nanocomposite of about 1.0:1.0:1.0, which itself represents a preferred embodiment of the nanocomposite.

TEM is primarily known for its ability to reveal fine structural details at atomic and molecular levels, it may also provide information about the size, shape, distribution, and morphology of pores in porous materials. TEM may reveal the fine details of pore structures, especially in materials with pores in the nanometer range (e.g., mesoporous materials). By imaging thin sections of the material, it may provide high-resolution images that help identify the size, shape, and arrangement of the pores.

In certain embodiments, the graphitic carbon nitride (g-C$_3$N$_4$) may be present in at least one of the following morphologies: nanorectangles; nanotriangles; nanopentagons; nanohexagons; nanoribbons; nanodiscs; nanoflakes; nanofoils; and, nanobelts.

In some embodiments, TEM images of the crystalline nanocomposite showed a two-dimensional porous structure constructed with curled and wrinkled nanosheets and platelets of the g-C$_3$N$_4$. In some embodiments, at least a fraction of the graphitic-C$_3$N$_4$ is in the form of mesoporous nanosheets; for example at least about 50 wt. %, at least about 55 wt. %, at least about 60 wt. %, at least about 65 wt. %, at least about 70 wt. %, at least about 75 wt. %, or at least about 80 wt. % of the graphitic-C$_3$N$_4$ is in the form of mesoporous nanosheets.

In some embodiments, at least a fraction of the $Bi_2O_3$ and at least a fraction of the CaSiO$_3$ of the crystalline nanocomposite are in the form of nanowires. For example, at least about 50 wt. %, at least about 55 wt. %, at least about 60 wt. %, at least about 65 wt. %, at least about 70 wt. %, at least about 75 wt. %, or at least about 80 wt. % of each of the $Bi_2O_3$ and the CaSiO$_3$ of the crystalline nanocomposite are in the form of nanowires. The nanowires of $Bi_2O_3$ and CaSiO$_3$ may have a median length, as determined by Transmission Electron Microscopy, of from about 20 to about 100 nm, for example from about 25 to about 95 nm, from about 30 to about 90 nm, from about 35 to about 85 nm, from about 40 to about 90 nm, from about 45 to about 90 nm, from about 50 to 90 nm, from about 55 to about 90 nm, from about 60 to about 90 nm, from about 65 to about 90 nm, from about 70 to about 90 nm, from about 75 to about 90 nm, from about 80 to about 90 nm or from about 85 to about 90 nm. In a specific embodiment, the nanowires of $Bi_2O_3$ and CaSiO$_3$ have a median length of about 87 nm, as determined by Transmission Electron Microscopy.

In some embodiments, the particulate crystalline nanocomposite has a surface area, as determined by Brunauer-Emmett-Teller (BET) analysis, of from 60 to about 100 m$^2$/g, for example from about 65 to about 95 m$^2$/g, from about 70 to about 90 m$^2$/g, from about 75 to about 85 m$^2$/g or from about 77 to about 83 m$^2$/g. In a preferred embodiment, the surface area of the crystalline nanocomposite is 79.5 m$^2$/g.

Typically the crystalline nanocomposite has a polymodal pore size distribution, as determined by Barrett-Joyner-Halenda (BJH) desorption analysis. In some embodiments, the crystalline nanocomposite has a trimodal pore size distribution, as determined by BJH desorption analysis. In exemplary embodiments, the trimodal pore size distribution of the crystalline nanocomposite has: a first mode in the range of from about 2 to about 6 nm, for example from about 3 to about 5 nm, or about 3.9 nm; a second mode in the range of from about 8 to about 12 nm, for example from about 9 to about 11 nm, or about 10.3 nm; and, a third mode in the range of from about 14 to about 18 nm, for example from about 15 to about 17 nm, or about 16.39 nm. A polymodal or trimodal pore size distribution in the particulate crystalline nanocomposites, as determined by BJH desorption analysis, enhances the material's functionality by offering multiple distinct pore sizes. The diversity improves adsorption capacity, catalytic efficiency, and mass transport by providing various pore environments that accommodate different molecule sizes.

In some embodiments, the crystalline nanocomposite has a pore volume, as determined by BJH desorption analysis of from about 0.1 to about 0.5 cubic centimeter per gram ($cm^3/g$), for example from about 0.2 to about 0.4 $cm^3/g$, or from about 0.2 to about 0.3 $cm^3/g$. y In an exemplary embodiment, the crystalline nanocomposite has a pore volume of 0.247 $cm^3/g$, as determined by BJH desorption analysis.

FIG. 1 illustrates a schematic flow chart of a method 50 of preparing the particulate crystalline nanocomposite. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes forming a solution of a calcium salt and an alkali metal silicate in a solvent which comprises water and a $C_1$-$C_4$ alkanol.

Exemplary calcium salts, which may be present alone or in combination, include but are not limited to calcium chloride, calcium sulfate, calcium carbonate, calcium phosphate, calcium acetate, calcium citrate, calcium lactate, calcium gluconate, calcium formate, calcium oxalate, calcium tartrate, calcium ascorbate, calcium benzoate, calcium propionate, calcium stearate, calcium hydroxide, calcium peroxide, calcium iodate, calcium molybdate, calcium hypochlorite, calcium thiocyanate, calcium chromate, calcium ferrite, calcium bromide, calcium fluoride, calcium sulfide, calcium arsenate, calcium tungstate, calcium borate, calcium perchlorate, and calcium hydride. In an embodiment, the calcium salt is selected from the group consisting of calcium sulfate ($CaSO_4$), calcium nitrate ($Ca(NO_3)_2$), calcium chloride ($CaCl_2$)) and calcium acetate ($Ca(CH_3COO)_2$). In a preferred embodiment, calcium salt is calcium nitrate.

Exemplary alkali metal silicates, which may be present alone or in combination, include but are not limited to potassium silicate, lithium silicate, rubidium silicate, cesium silicate, sodium orthosilicate, potassium orthosilicate, lithium orthosilicate, rubidium orthosilicate, cesium orthosilicate, sodium disilicate, potassium disilicate, lithium disilicate, rubidium disilicate, cesium disilicate, sodium trisilicate, potassium trisilicate, lithium trisilicate, rubidium trisilicate, cesium trisilicate, sodium tetrasilicate, potassium tetrasilicate, lithium tetrasilicate, rubidium tetrasilicate, cesium tetrasilicate, sodium hexasilicate, potassium hexasilicate, lithium hexasilicate, rubidium hexasilicate, and cesium hexasilicate. In a preferred embodiment, alkali metal silicate is sodium metasilicate.

In some embodiments, the molar ratio of the calcium salt to the alkali metal silicate is from about 1:5 to 5:1, for example about 1:4 to 4:1, about 3:1 to 1:3, about 1:2 to 2:1, or about 1:1. Exemplary $C_1$-$C_4$ alkanols, which may be present alone or in combination, include but are not limited to methanol, propanol, isopropanol, butanol, isobutanol, sec-butanol, tert-butanol, 1-propanol, 2-propanol, 1-butanol, 2-butanol, methylpropanol, dimethylpropanol, ethylpropanol, cyclopropanol, fluoromethanol, chloromethanol, bromomethanol, and iodomethanol. In a preferred embodiment, the $C_1$-$C_4$ alkanol comprises or consists of ethanol.

In an embodiment of step 52, the volume-by-volume (v/v) ratio of water to $C_1$-$C_4$ alkanol is in the range of about 1:5 to 5:1, for example about 1:4 to 4:1, about 1:3 to 3:1, or about 1:2 to 2:1. In a preferred embodiment, the v/v ratio of water to $C_1$-$C_4$ alkanol is 1:1.

At step 54, the method 50 includes heating the solution at a temperature of from about 150 to about 250° C. to form a dry product of $CaSiO_3$. This step involves the chemical reaction and dehydration process that are necessary for converting the precursor materials into the desired solid product. In some embodiments, heating takes place at temperature of from about 110 to about 210° C., for example from about 120 to about 220° C., from about 130 to about 230° C., from about 140 to about 220° C., from about 150 to about 210° C., from about 160 to about 200° C., from about 170 to about 190° C., or about 180° C. to form the dry product of $CaSiO_3$. The solution is preferably heated in an autoclave; optionally, other known heating appliances may be used.

At step 56, the method 50 includes forming graphitic-$C_3N_4$ by heating urea in a closed vessel at a temperature of about 500 to about 700° C. In some embodiments, the urea is heated in a closed vessel at a temperature in a range from about 500 to about 700° C., for example from about 550 to about 700° C., from about 600 to about 700° C., or from about 650 to about 700° C. In a preferred embodiment, the urea is heated in a closed vessel at about 600° C. In some embodiments, the urea is heated in a closed vessel for a duration of from about 10 to about 60 minutes, for example from about 20 to about 60 minutes, from about 30 to about 60 minutes, from about 40 to about 60 minutes, from about 50 to about 60 minutes. In a preferred embodiment, the urea is heated in a closed vessel for about 45 minutes.

At step 58, the method 50 includes forming an acidified solution in a polar protic solvent of a bismuth salt and a reducing sugar.

Exemplary acids having utility in the acidifying of the solution include, but are not limited to, phosphoric acid, hydrofluoric acid, hydrobromic acid, hydroiodic acid, perchloric acid, chloric acid, bromic acid, iodic acid, selenic acid, telluric acid, carbonic acid, silicic acid, boric acid, chromic acid, manganic acid, periodic acid, arsenic acid, antimonic acid, stannic acid, phosphorous acid, hypophosphorous acid, hypochlorous acid, chlorous acid, hypobromous acid, bromous acid, hypoiodous acid, iodous acid, perbromic acid, periodic acid and carbonic acid. In some embodiments, the acidified solution may include an acid selected from the group consisting of hydrochloric acid (HCl), sulfuric acid ($H_2SO_4$), perchloric acid ($HClO_4$), boric acid ($H_3BO_3$), and nitric acid ($HNO_3$). In an exemplary embodiment, the acid is $HNO_3$.

Independently of, or additional to the use of these acids, it is preferred that the acidified aqueous solution has a pH of from about 2 to about 6, for example of from about 2 to about 5 or from about 3 to about 5.

Exemplary bismuth salts, which may be used alone or in combination, include bismuth nitrate, bismuth subsalicylate and bismuth carbonate. In a preferred embodiment, the bismuth salt is bismuth nitrate.

Suitable examples of reducing sugar include, but are not limited to, glucose, fructose, galactose, ribose, maltose and lactose. These reducing sugars may facilitate the reduction of various metallic ions to their lower oxidation states in an acidified aqueous solution, depending on the specific reaction and desired product. In some embodiments, the reducing sugar may be selected from monosaccharides, disaccharides, oligosaccharides, or polysaccharides. In a preferred embodiment, the reducing sugar is a monosaccharide selected from the group consisting of trioses, tetroses, pentoses, hexoses and heptoses. In another preferred embodiment, the reducing sugar is selected from the group consisting of erythrose, threose, erythrulose, ribose, arabinose, xylose, lyxose, ribulose, arabulose, xylulose, lyxulose, glucose, mannose, galactose, allose, altrose, talose, gulose, idose, fructose, psicose, sorbose, tagatose, and sedoheptulose. In yet another preferred embodiment, the reducing sugar is xylose.

Exemplary polar protic solvents for step 58, which may be used alone or in combination, include but are not limited to: water and $C_1$-$C_4$ alkanols. In a preferred embodiment, the polar protic solvent of step 58 comprises or consists of water.

In some embodiments, the w/w ratio of the bismuth salt to the reducing sugar is about 1:5 to 5:1, for example from about 1:4 to 4:1, from about 1:3 to 3:1, from about 1:2 to 2:1, or about 1:1.

At step 60, the method 50 includes heating the acidified solution at a temperature of from about 150 to about 250° C. for a sufficient duration to carbonize the reducing sugar, such as xylose, in the presence of the acidified solution. The temperature range ensures efficient carbonization while preventing decomposition of the desired product. During the heating stage, the reducing sugar undergoes dehydration and polymerization to form a black carbonaceous material, which serves as the precursor for further processing.

In some embodiments, the acidified solution is heated at a temperature in a range from 150 to 250° C., for example from about 175 to about 250° C. or from about 175 to about 2225° C. In a preferred embodiment, the solution is heated at 200° C. In some embodiment, the acidified solution is heated for a duration of from about 1 to about 5 hours, for example from about 1.5 to about 5 hours, from about 2 to about 5 hours, from about 2.5 to about 5 hours, from about 3 to about 5 hours, from about 3.5 to about 5 hours, from about 4 to about 5 hours, or from about 4.5 to about 5 hours. In a preferred embodiment, the acidified solution is heated for 3 hours.

At step 62, the method 50 includes comminuting the carbonized product of the heating stage, typically by grinding or milling in a mortar and pestle or a ball mill, to reduce the particle size to a desired range, such as from about 50 to about 200 microns, to facilitate further processing. The comminution process ensures uniformity in the particle size, which is crucial for subsequent calcination and synthesis steps.

At step 64, the method 50 includes calcining the comminuted carbonized product at a temperature of from about 500 to about 1200° C., for example from about 510 to about 650° C., or about 550° C. Without intention to limit the present disclosure, calcination may be performed for a duration of from about 1 to about 5 hours, for example from about 2.5 to about 4.5 hours, or about 4 hours to form $Bi_2O_3$. The calcination is carried out by heating it to a high temperature under a restricted supply of ambient oxygen. This is performed to remove impurities or volatile substances and to incur thermal decomposition. Typically, the calcination is carried out in a furnace, conventionally equipped with a temperature control system, which may provide a heating rate of up to about 50° C./min, for example up to 40° C./min, up to about 30° C./min, up to about 20° C./min, up to about 10° C./min, or up to about 5° C./min.

At step 66, the method 50 includes dispersing the $CaSiO_3$, graphitic-$C_3N_4$ and $Bi_2O_3$ in a polar protic solvent and heating the dispersion: at a temperature of from about 150 to about 250° C.; and, at a pressure of from about 2 to about 8 Bars. In some embodiments, the mixture may optionally be further sonicated or ultrasonicated to enhance the dispersion of $CaSiO_3$, graphitic-$C_3N_4$, and $Bi_2O_3$ in the polar protic solvent by using (ultra) sonic waves to break up agglomerates and promote a uniform mixture.

Exemplary polar protic solvents for step 66 include, but are not limited to, methanol, isopropanol, n-propanol, butanol, isobutanol, tert-butanol, pentanol, hexanol, cyclohexanol, ethylene glycol, propylene glycol, glycerol, formamide, mono($C_1$-$C_4$)alkyl ethers of ethylene glycol, mono($C_1$-$C_4$) alkyl ethers of propylene glycol dimethylformamide (DMF), acetic acid, propionic acid, lactic acid, formic acid, citric acid, phosphoric acid, trifluoroacetic acid, water, ammonia, methylamine, ethylamine, isopropylamine, n-propylamine, butylamine, sec-butylamine, tert-butylamine, diethylamine, dipropylamine, dimethylamine, triethylamine, triethanolamine, n-methylformamide (NMF), n-methylacetamide (NMA), hydrazine, hydroxylamine, and urea. In an exemplary embodiment, the polar protic solvent is a $C_1$-$C_4$ alkanol. In a preferred embodiment, the polar protic solvent is selected from the group consisting of mono($C_1$-$C_4$)alkyl ethers of ethylene glycol. An exemplary polar protic solvent is ethylene glycol monomethyl ether.

In some embodiments, the solution is heated at a temperature in a range from about 150 to about 250° C., for example from about 170 to about 250° C., from about 190 to about 250° C., from about 210 to about 250° C., or from about 230 to about 250° C. In an exemplary embodiment, the solution is heated at about 180° C. In some embodiments, the solution is heated for a duration of from about 1 to about 5 hours, for example from about 1.5 to about 5 hours, from about 2 to about 5 hours, from about 2.5 to about 5 hours, from about 3 to about 5 hours, from about 3.5 to 5 hours, from about 4 to about 5 hours, from about 4.5 to about 5 hours. In an exemplary embodiment, the solution is heated for a duration of from about 2 to about 4 hours. In an alternative embodiment, the solution is heated for about 1 hour. In some embodiments, the solution is heated at about 180° C. at pressure ranging from about 2 to about 8 bar, for example from about 3 to about 8 bar, from about 4 to about 8 bar, from about 5 to about 8 bar, from about 6 to about 8 bar, or from about 7 to about 8 bar. In a preferred embodiment, the solution is heated at a pressure is about 5 bar.

At step 68, the method 50 includes separating the solid crystalline nanocomposite from the heated dispersion. This separation may be achieved using techniques such as filtration (e.g., gravity filtration, vacuum filtration, pressure filtration, or membrane filtration), centrifugation, decantation, gas flotation, capacitance-based separation, or microfiltration. Alternative separation methods include natural and forced sedimentation, magnetic separation, vacuum distillation, chemical conversion, and chromatography. In a preferred embodiment, filtration is performed via a Buchner system.

It is not precluded that the separated particulate crystalline nanocomposite be subjected to further processing. Such further processing may be performed in a single stage or multistage manner and may include one or more of: washing with water; drying; and, comminuting the nanocomposite in order to moderate particle morphology or the particle size distribution thereof. Exemplary drying conditions include a temperature of from about 50 to about 200° C., such as from about 100 to about 200° C. or from about 120 to about 180° C. Such drying may be carried out using known heating methods, such as a vacuum oven, rotary evaporator, microwave-assisted drying process, freeze-drying, and infrared drying.

The method comprises hydrolyzing $NaBH_4$ in the presence of the $Bi_2O_3$/$CaSiO_3$/g-$C_3N_4$ catalyst at a temperature of about 25 to about 70° C., for example from about 27 to about 30° C., or about 28° C. In some embodiments, sodium borohydride is hydrolyzed with water at a temperature of from about 35 to about 60° C., for example from about 37 to about 40° C., or about 38° C.

The ratio by weight of sodium borohydride to the particulate crystalline nanocomposite catalyst is from about 1:1 to 5:1, for example from about 1:1 to 4.5:1, about 1:1 to 3:1, or about 1.8:1 to 2.2:1.

In embodiments of the hydrolysis method, the $NaBH_4$, in solid form, is mixed with the nanocomposite in solid form to provide a solid composition that is stable and storable at room temperature: there may be no decomposition to form hydrogen when the solid mixture of the $NaBH_4$ and the nanocomposite is stored under anhydrous conditions. The stable composition is later used as a source of hydrogen via the addition of water thereto. In alternate embodiments, the $NaBH_4$, in solid form and the nano composite are mixed immediately prior to contact with water.

It is preferred in the hydrolysis reaction that the median volume particle size (Dv50) of the nanocomposite catalyst is substantially less than the median volume particle size (Dv50) of the $NaBH_4$. The $NaBH_4$ may, for example, have a median volume particle size (Dv50) that is at least 5 or even at least 10 times the median volume particle size of the nanocomposite. Differences in the particle size between the two solids provide a means by which the rate of formation of hydrogen gas is buffered. For example, the rate of hydrogen gas formation achieved by adding liquid water to a mixture of particles of $NaBH_4$ and particles of the nanocomposite having essentially the same particle size may be from 2 to 6 times the rate of hydrogen formation provided by adding water to a mixture of particles of the $NaBH_4$ and the nano composite in which the $NaBH_4$ particles have an average particle size that is at least five times, preferably at least 10 times the particle size of the nanocomposite.

The hydrogen gas evolved as a hydrolysis product should be captured. This is often accomplished via gas collection equipment, such as inverted jars or specialized balloons, which allow the gas to gather securely. As the hydrogen forms, it is directed into these containers to keep it from escaping. Safety precautions are crucial since hydrogen is highly flammable. Once captured, hydrogen may be refined and stored for use in a variety of applications, including fuel cells and energy generation, making it an important resource for sustainable energy solutions.

The method has a hydrogen generation rate of from about 100 to about 1500 milliliters per minute per gram (mL min$^{-1}$ g$^{-1}$) based on the weight of the sodium borohydride, for example from about 200 to about 1500 mL min$^{-1}$ g$^{-1}$, or from about 225 mL min$^{-1}$ g$^{-1}$ to about 1330 mL min$^{-1}$ g$^{-1}$. Hydrogen generation rate refers to the amount of hydrogen gas produced per unit of time.

In some embodiments, the method of present disclosure may be adapted to other borohydride salts, including, but not limited to, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper (II) borohydride, thallium borohydride, gold borohydride, silver borohydride, rhodium borohydride, palladium borohydride, antimony borohydride, and/or combinations thereof may also be used.

EXAMPLES

The following examples demonstrate the preparation and properties of a $Bi_2O_3/CaSiO_3@g-C_3N_4$ nanocomposite and the use of said nanocomposite as a catalyst in the hydrolysis of $NaBH_4$ in water for producing hydrogen gas. The examples are provided solely for illustration and are not to be construed as limitations of the present disclosure, as many variations thereof are possible without departing from the spirit and scope of the present disclosure.

Example 1. Method of Preparation

Equimolar amounts of calcium nitrate and sodium metasilicate were dispersed in 100 milliliters (ml) of ethanol: water (ratio by volume, 1:1) in a 150 mL glass beaker and sonicated for 15 min. The mixture was transferred to a 200 mL autoclave and then placed in an oven operated at 180° C. for 2.0 hours. The product was dispersed in 500 ml distilled water with an ultrasonic bath for 10 minutes, filtered via a Buchner system, rinsed with distilled water, and dried at 120° C. for 1.0 hour.

About 30.0 grams (g) of urea was placed in a 250 mL porcelain crucible, covered with its porcelain cover, then the whole crucible and cover were wrapped with three layers of aluminum foil to reduce urea loss by evaporation. The crucible was heated via a furnace set at 600° C. for 45 minutes.

About 10.0 bismuth nitrate and 10.0 g of xylose were placed in a 500 ml beaker. 100 mL ethylene glycol monomethyl ether was added to the mixture which was then heated until a clear solution was obtained. 10 mL of concentrated nitric acid was added to the mixture, which was then heated until the carbonization of xylose. The mixture was placed in an oven set at 200° C. for 3.0 hours; the black carbonized product was milled in a mortar, placed in a 150 mL porcelain dish, and calcined at 550° C. for 4.0 hours.

Equal amounts of $CaSiO_3$, $g-C_3N_4$, and $Bi_2O_3$ was transferred to a mono wave-200 vial (G30), dispersed in 20 mL ethylene glycol monomethyl ether via an ultrasonic bath for 30 minutes. The vial was closed with its Teflon cover and placed in the Anton-Baar Monowave-200 operated at 180° C. and 5.0 bar pressure for one hour. The product was dispersed in 1 L distilled water with an ultrasonic bath for 30 minutes, filtered via a Buchner system, rinsed with distilled water, and dried at 150° C. for 2.0 hours.

Figure 2:
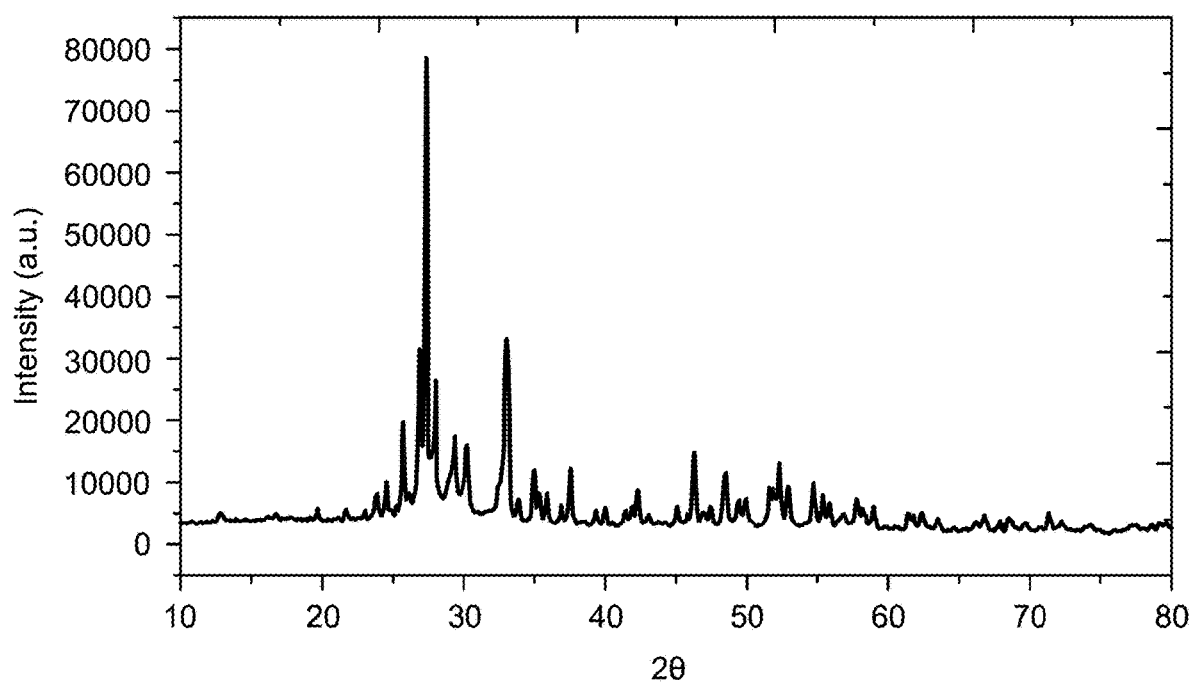
FIG. 2 depicts an X-ray diffraction (XRD) diffractogram of a $Bi_2O_3$/$CaSiO_3$/g-$C_3N_4$ nanocomposite catalyst, according to certain embodiments.

The crystallinity and phases identification present in the $Bi_2O_3/CaSiO_3/g-C_3N_4$ catalyst was analyzed by X-ray diffraction (XRD), and the results are given in FIG. 2. The intense peaks and high-intensity values indicate that the powder is highly crystalline. Examination of the diffraction patterns with the standard powder diffraction file (PDF) cards reveals the presence of $Bi_2O_3$ as the most prominent phase and $CaSiO_3$ and $g-C_3N_4$ as minor phases. The $Bi_2O_3$ phase was indexed to the 2θ values of 25.7, 26.9, 27.4, 28.0, 33.0, 33.2, 35.0, and 46.3°. These diffractions are, respectively, assigned to (002), (−112), (−121), (012), (−122), (−202), (−212), and (−223) plans of the monoclinic phase of $Bi_2O_3$ (JCPDS Card No. 00-027-0053, the disclosure which is incorporated herein by reference in its entirety). The $CaSiO_3$ phase (JCPDs Card No. 01-072-2297, the disclosure which is incorporated herein by reference in its entirety) was detected at 2θ values of 23.9, 26.9, and 30.2°. These diffractions were respectively coming from (31-1), (20-2), and (320). The diffractions related to g-$C_3N_4$ were observed at 19.6, 27.4, and 33.9° (JCPDS Card No. 01-070-1037, the disclosure which is incorporated herein by reference in its entirety). No other phases were detected, indicating the successful fabrication of $Bi_2O_3$/$CaSiO_3$/g-$C_3N_4$.

Figure 3A:
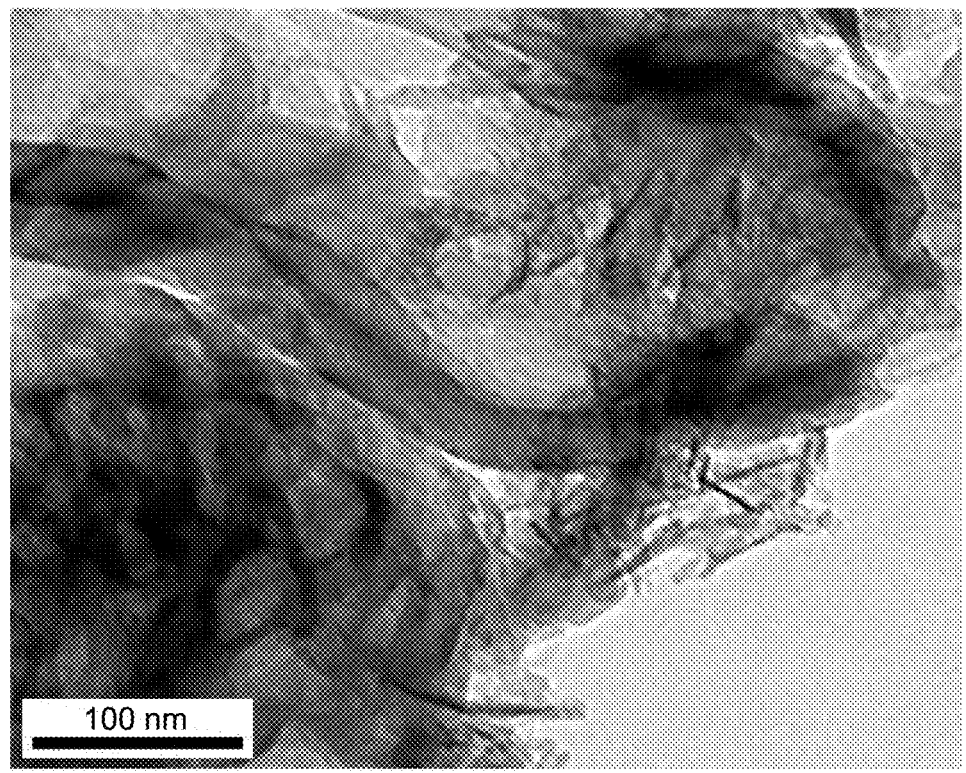
FIGS. 3A-3B depict transmission electron microscopy (TEM) images of the $Bi_2O_3$/$CaSiO_3$/g-$C_3N_4$ catalyst, according to certain embodiments.
Figure 3B:
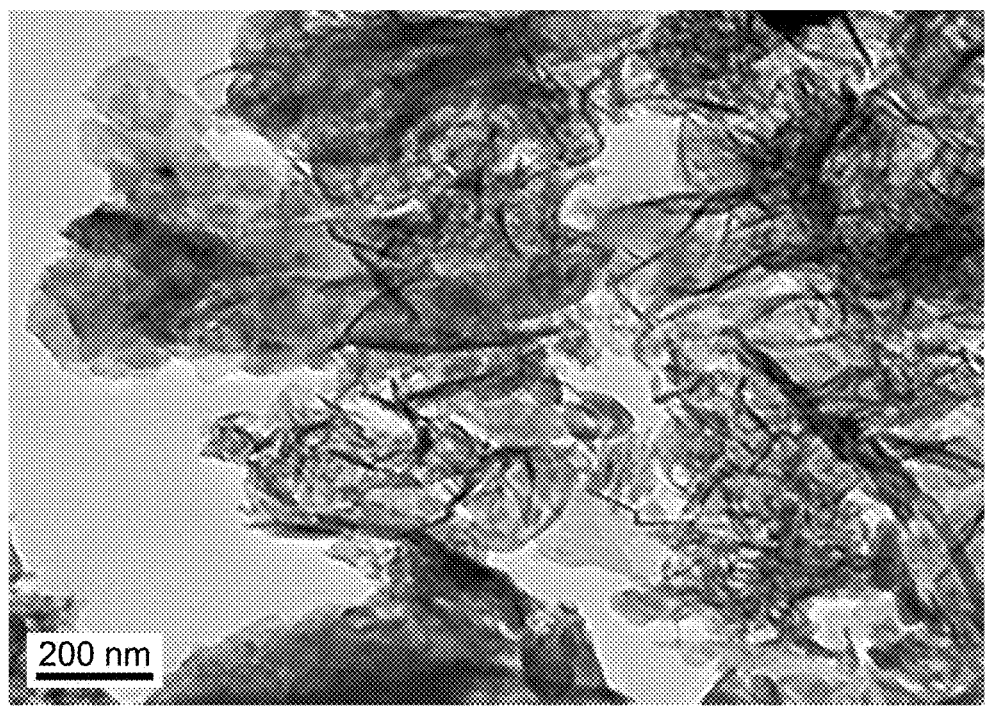
Figure 3C:
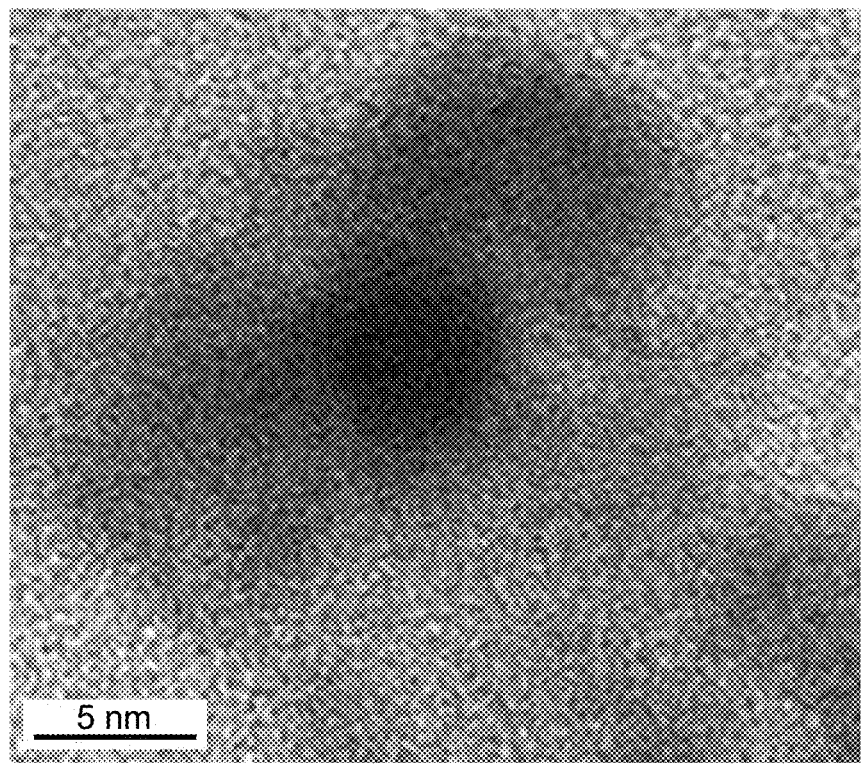
FIG. 3C shows a high resolution transmission electron microscope (HR-TEM) image of the $Bi_2O_3$/$CaSiO_3$/g-$C_3N_4$ catalyst, according to certain embodiments.
Figure 3D:
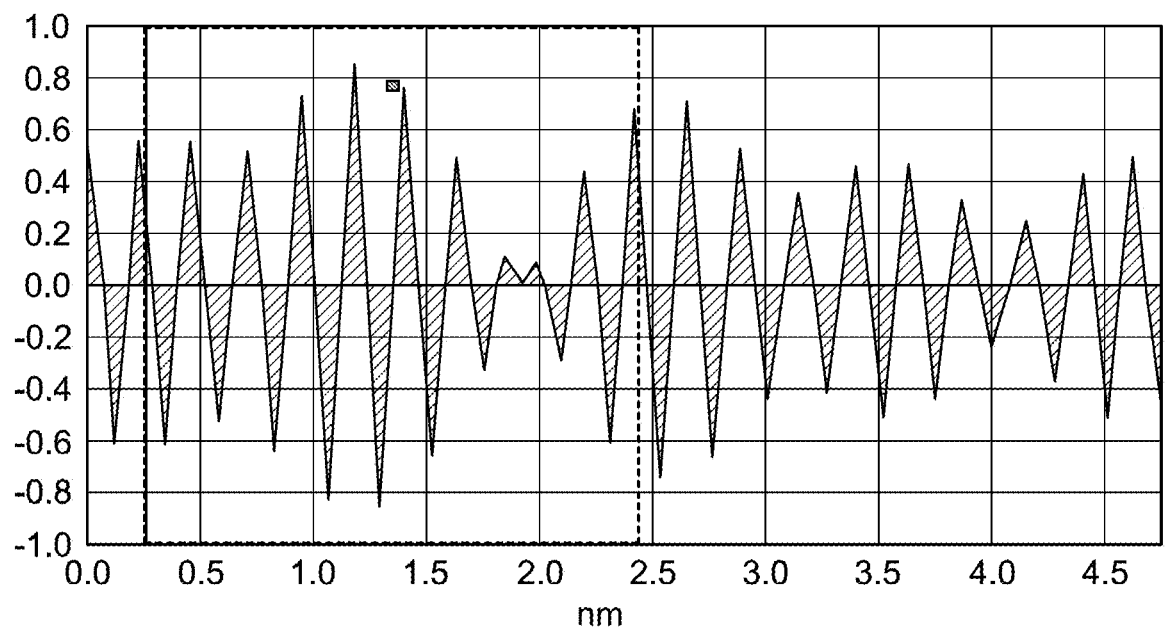
FIG. 3D shows a Fast Fourier Transform (FFT) image of the $Bi_2O_3$/$CaSiO_3$/g-$C_3N_4$ catalyst, according to certain embodiments.
Figure 3E:
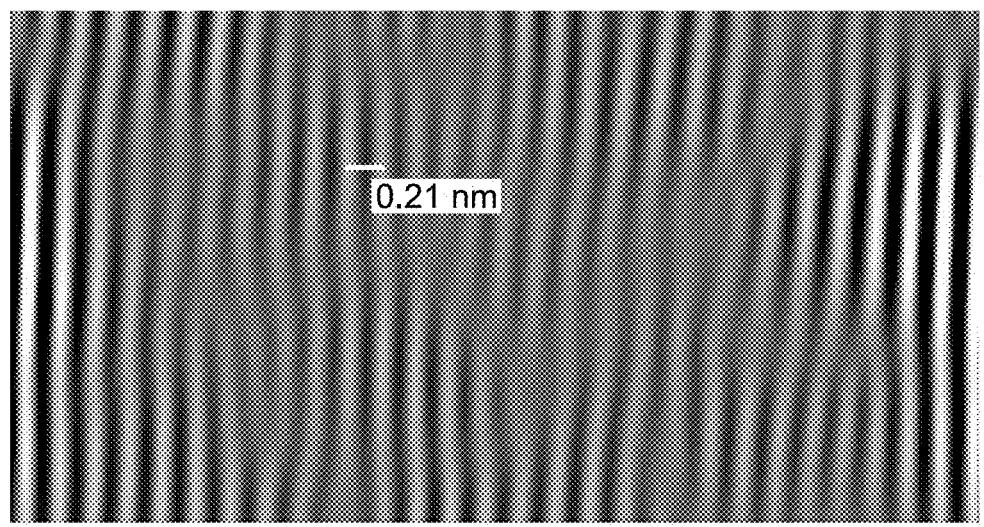
FIG. 3E shows an Inverse Fast Fourier Transform (IFFT) of the $Bi_2O_3$/$CaSiO_3$/g-$C_3N_4$ catalyst, according to certain embodiments.

Transmission electron microscopy (TEM) images of the synthesized $Bi_2O_3$/$CaSiO_3$@ g-$C_3N_4$ nanocomposite are presented in FIGS. 3A-3B. The TEM images showed a two-dimensional porous structure constructed with curled and wrinkled nanosheets and platelets of the g-$C_3N_4$ (FIG. 3A). The image also shows a homogeneous dispersion of nanowires of metal oxides-having a median length of 87 nanometers (nm)—on nanosheets of g-$C_3N_4$. The corresponding High-Resolution Transmission Electron Microscopy (HRTEM) of the composite shows a plane spacing of 0.25 nm related to the (−212) of $Bi_2O_3$ (FIG. 3C). The Fast Fourier transform (FFT), and inverse Fast Fourier transform (IFFT) measurements show a d-value of 0.21 nm given to $Bi_2O_3$/$CaSiO_3$@ g-$C_3N_4$ nanocomposite, signifying the lattice spacing of ((−223), indicating the development of $Bi_2O_3$ structure (FIG. 3D and FIG. 3E).

Figure 4A:
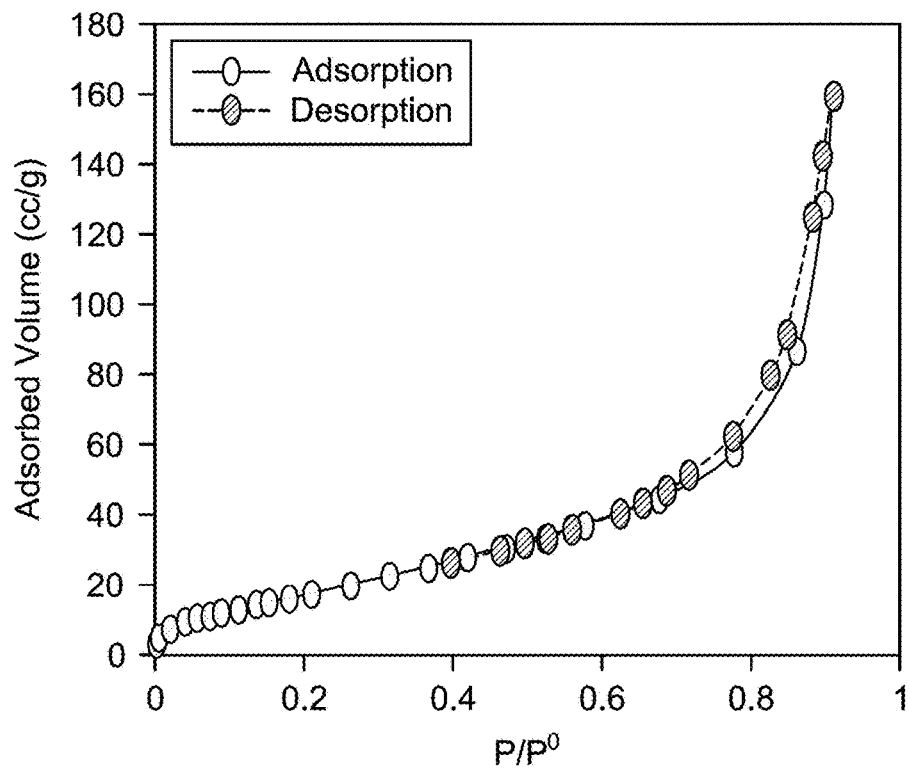
FIG. 4A depicts adsorption-desorption isotherms of the $Bi_2O_3$/$CaSiO_3$/g-$C_3N_4$ catalyst, according to certain embodiments.
Figure 4B:
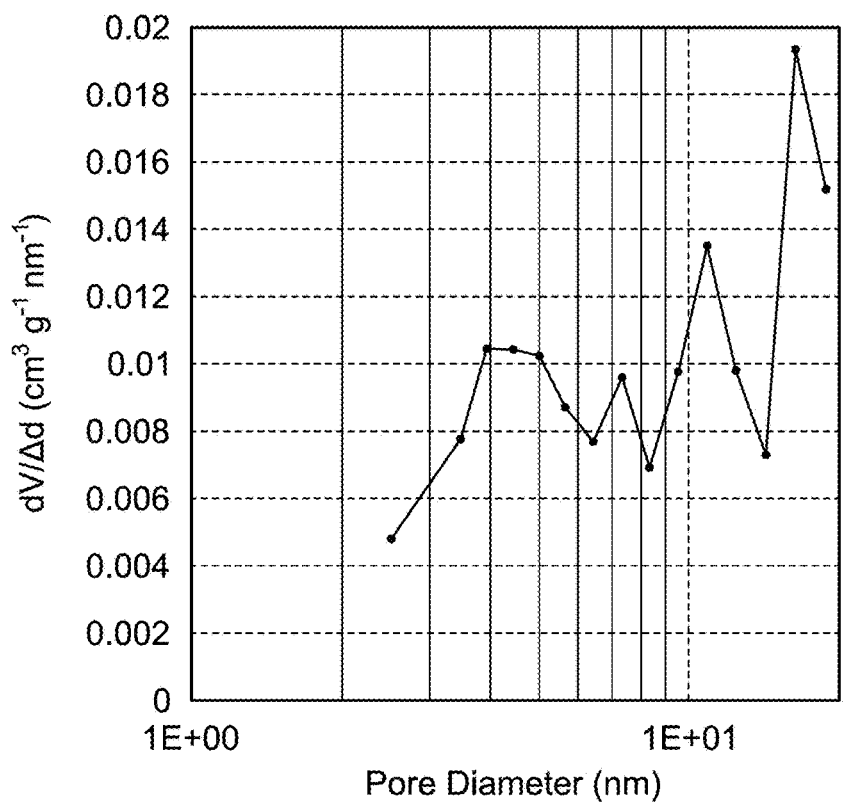
FIG. 4B depicts a pore size distribution curve of the $Bi_2O_3$/$CaSiO_3$/g-$C_3N_4$ catalyst, according to certain embodiments.

FIGS. 4A-4B display the nitrogen adsorption-desorption isotherms of $Bi_2O_3$/$CaSiO_3$@ g-$C_3N_4$ nanocomposite. The composite's nitrogen sorption isotherm belongs to type IV with a narrow hysteresis loop, indicating the formation of mesoporous structures. However, shifting the loop to a relatively higher pressure (P/P°=0.69-1) suggests the presence of wide mesopores may result from the deposition of metal oxide particles in the wide pores of g-$C_3N_4$. Furthermore, the Brunauer-Emmett-Teller (BET) surface area of the $Bi_2O_3$/$CaSiO_3$/g-$C_3N_4$ sample was calculated to be 79.5 meter square per gram ($m^2$ $g^{-1}$). The marked high specific surface area reflects the good dispersion of these metal oxide nanoparticles on g-$C_3N_4$ and $CaSiO_3$. Moreover, the pore size distribution curves, plotted using the Barrett-Joyner-Halenda (BJH) method, for the $Bi_2O_3$/$CaSiO_3$@g-$C_3N_4$ sample exhibited trimodal distribution with modes (or average pore diameters maxima) at 3.9, 10.3, and 16.39 nm. The pore volume of the $Bi_2O_3$/$CaSiO_3$/g-$C_3N_4$ sample was determined by BJH desorption analysis to be 0.247 cubic per gram ($cm^3$ $g^{-1}$). All the isotherms of the $Bi_2O_3$/$CaSiO_3$/$C_3N_4$ sample belong to the category H3 type of pores, which do not exhibit limiting adsorption at high P/P° and arise due to aggregation of plate-like particles giving rise to slit-shaped pores; this indicates that $Bi_2O_3$/$CaSiO_3$@g-$C_3N_4$ composite assembly provoked a mesoporous array.

Figure 5:
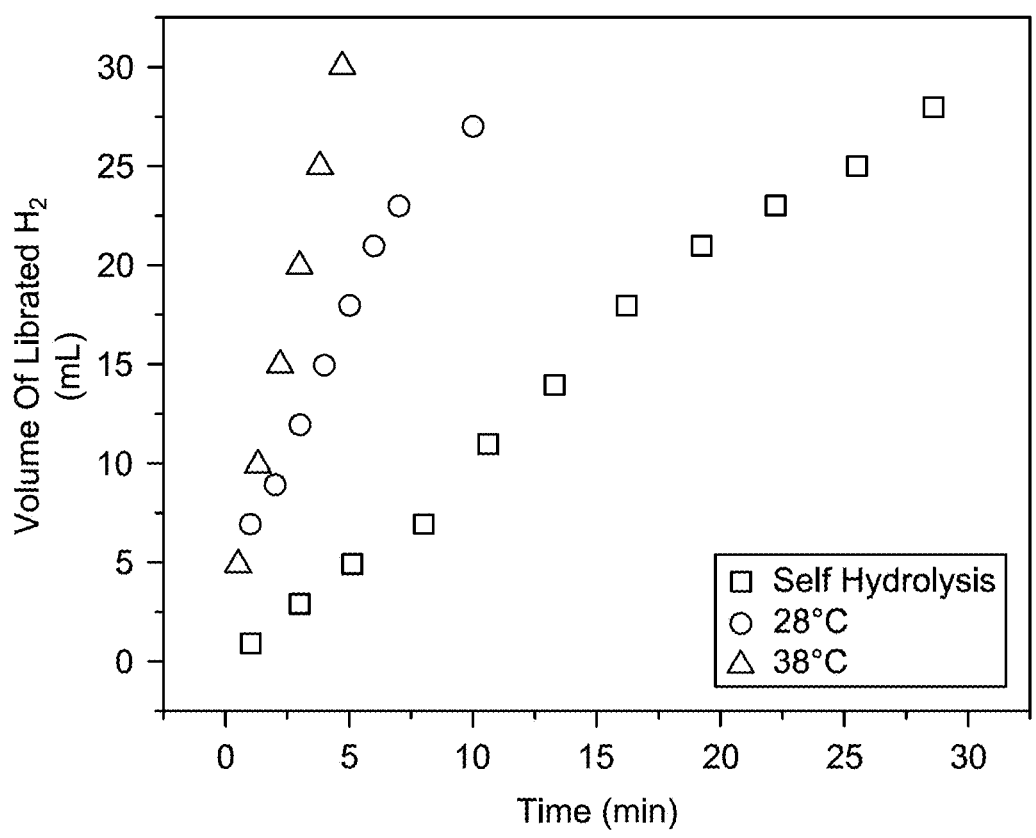
FIG. 5 depicts variation of volume of liberated hydrogen with reaction time over of the $Bi_2O_3$/$CaSiO_3$/g-$C_3N_4$ catalyst, according to certain embodiments.

The results of hydrolysis of $NaBH_4$ with and without a fixed amount (0.5 g) of $Bi_2O_3$/$CaSiO_3$/g-$C_3N_4$ catalyst are shown in FIG. 5. The catalytic action of the $Bi_2O_3$/$CaSiO_3$/g-$C_3N_4$ catalyst was observed, and the catalytic reaction exhibited higher hydrogen generation rates than the self-hydrolysis process. According to the data analysis, hydrogen gas volume rises gradually over time. In addition, the catalytic hydrolysis reaction increases with the increase in reaction temperature. Results demonstrate that, on using 0.7 g of $NaBH_4$ and 0.5 g of the $Bi_2O_3$/$CaSiO_3$/g-$C_3N_4$ sample as a catalyst, values of HGR of 225.0 and 1330.0 milliliters per minute per gram (mL $min^{-1}$ $g^{-1}$) were obtained at reaction temperatures of 28 and 38° C., respectively.

Numerous modifications and variations of the present disclosure are possible in light of the above teachings. It is, therefore, to be understood that within the scope of the appended claims, the invention may be practiced otherwise than as specifically described herein.

The invention claimed is:

1. A method of producing hydrogen gas, the method comprising:
   hydrolyzing sodium borohydride ($NaBH_4$) with water at a temperature of from about 20 to about 75° C. in the presence of a particulate crystalline nanocomposite catalyst,
   wherein the ratio by weight of sodium borohydride to the particulate crystalline nanocomposite catalyst is from about 1:1 to about 5:1,
   wherein the particulate crystalline nanocomposite catalyst comprises:
   a monoclinic $Bi_2O_3$ crystalline phase;
   a $CaSiO_3$ crystalline phase; and,
   a graphitic-$C_3N_4$ crystalline phase,
   wherein at least a fraction of the graphitic-$C_3N_4$ is in the form of mesoporous nanosheets.

2. The method according to claim 1, wherein the ratio by weight of $Bi_2O_3$ to $CaSiO_3$ to graphitic-$C_3N_4$ in the particulate crystalline nanocomposite is about (0.8-1.2):(0.8-1.2): (0.8-1.2).

3. The method according to claim 1, wherein the ratio by weight of $Bi_2O_3$ to $CaSiO_3$ to graphitic-$C_3N_4$ in the particulate crystalline nanocomposite is about 1.0:1.0:1.0.

4. The method according to claim 1, wherein at least a fraction of the $Bi_2O_3$ and at least a fraction of the $CaSiO_3$ of the crystalline nanocomposite are in the form of nanowires.

5. The method according to claim 4, wherein:
   at least 50 wt. % of the $Bi_2O_3$ is in the form of nanowires; and,
   at least 50 wt. % of the $CaSiO_3$ is in the form of nanowires.

6. The method according to claim 4, wherein the nanowires of $Bi_2O_3$ and $CaSiO_3$ have a median length of from about 20 to about 100 nm, as determined by Transmission Electron Microscopy.

7. The method according to claim 1, wherein at least 50 wt. % of the graphitic-$C_3N_4$ is in the form of mesoporous nanosheets.

8. The method according to claim 1, wherein the crystalline nanocomposite has a multimodal pore size distribution, as determined by Barrett-Joyner-Halenda (BJH) desorption analysis.

9. The method according to claim 1, wherein the crystalline nanocomposite has a trimodal pore size distribution, as determined by BJH desorption analysis.

10. The method according to claim 9, wherein the trimodal pore size distribution of the crystalline nanocomposite has:
    a first mode in the range of from about 2 to about 6 nm;
    a second mode in the range of from about 8 to about 12 nm; and,
    a third mode in the range of from about 14 to about 18 nm.

11. The method according to claim 1, wherein the crystalline nanocomposite has a surface area of from about 60 to about 100 $m^2$/g, as determined by Brunauer-Emmett-Teller (BET) analysis.

12. The method according to claim 1, wherein the crystalline nanocomposite has a surface area of from about 70 to about 90 $m^2$/g, as determined by BET analysis.

13. The method according to claim 1, wherein the crystalline nanocomposite has a pore volume of from about 0.1 to about 0.5 $cm^3$/g, as determined by BJH desorption analysis.

14. The method according to claim 1, wherein the crystalline nanocomposite has a pore volume of from about 0.2 to about 0.3 $cm^3$/g, as determined by BJH desorption analysis.

15. The method according to claim 1 further comprising preparing the particulate crystalline nanocomposite by:
- forming a solution of a calcium salt and an alkali metal silicate in a solvent comprising water and a $C_1$-$C_4$ alkanol;
- heating the solution at a temperature of from about 150 to about 250° C. to form a dry product of $CaSiO_3$;
- forming graphitic-$C_3N_4$ by heating urea in a closed vessel at a temperature of from about 500 to about 700° C.;
- forming an acidified solution in a polar protic solvent of a bismuth salt and reducing sugar;
- heating the acidified solution at a temperature of from about 150 to about 250° C. for a sufficient duration to carbonize the reducing sugar to form a carbonized product;
- comminuting the carbonized product of the heating stage;
- calcining the comminuted carbonized product at a temperature of from about 500 to about 1200° C. for a duration of from about 1 to about 5 hours to form $Bi_2O_3$;
- dispersing the $CaSiO_3$, graphitic-$C_3N_4$ and $Bi_2O_3$ in a polar protic solvent and heating the dispersion at a temperature of from about 150 to about 250° C. at a pressure of from about 2 to about 8 Bar; and,
- separating the solid crystalline nanocomposite from the heated dispersion.

16. The method according to claim 1, wherein the ratio by weight of sodium borohydride to the particulate crystalline nanocomposite catalyst is from about 1:1 to about 3:1.

17. The method according to claim 1, wherein sodium borohydride is hydrolyzed with water at a temperature of from about 25 to about 70° C.

18. The method according to claim 1, wherein sodium borohydride is hydrolyzed with water at a temperature of from about 35 to about 60° C.

19. The method according to claim 1 having a hydrogen generation rate of from about 100 to about 1500 mL $min^{-1}$ $g^{-1}$ based on the weight of the sodium borohydride.

20. The method according to claim 1 having a hydrogen generation rate of from about 200 to about 1500 mL $min^{-1}$ $g^{-1}$ based on the weight of the sodium borohydride.

* * * * *